Dec. 16, 1958 E. WOLDRING ET AL 2,864,319
EXTENDIBLE ENDLESS CHAIN CONVEYOR
Filed Oct. 22, 1954 4 Sheets-Sheet 2
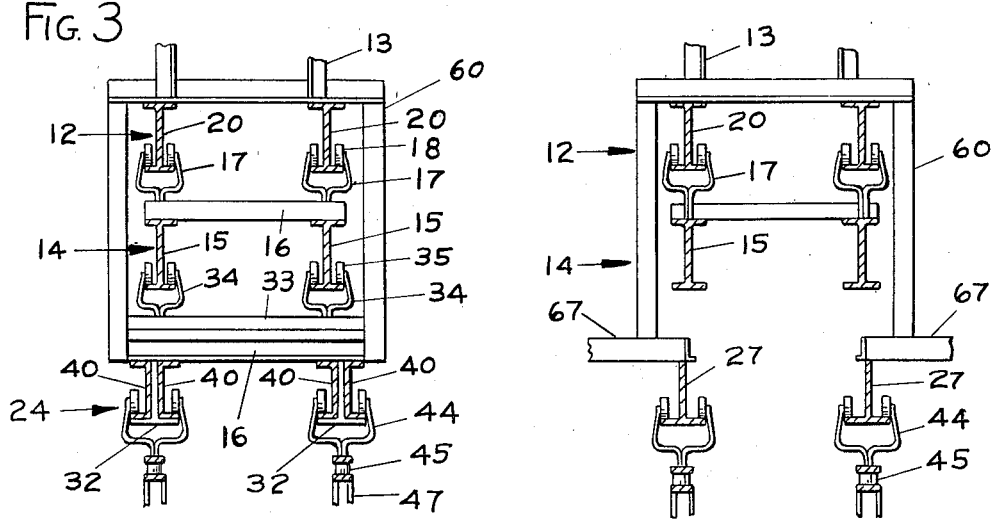
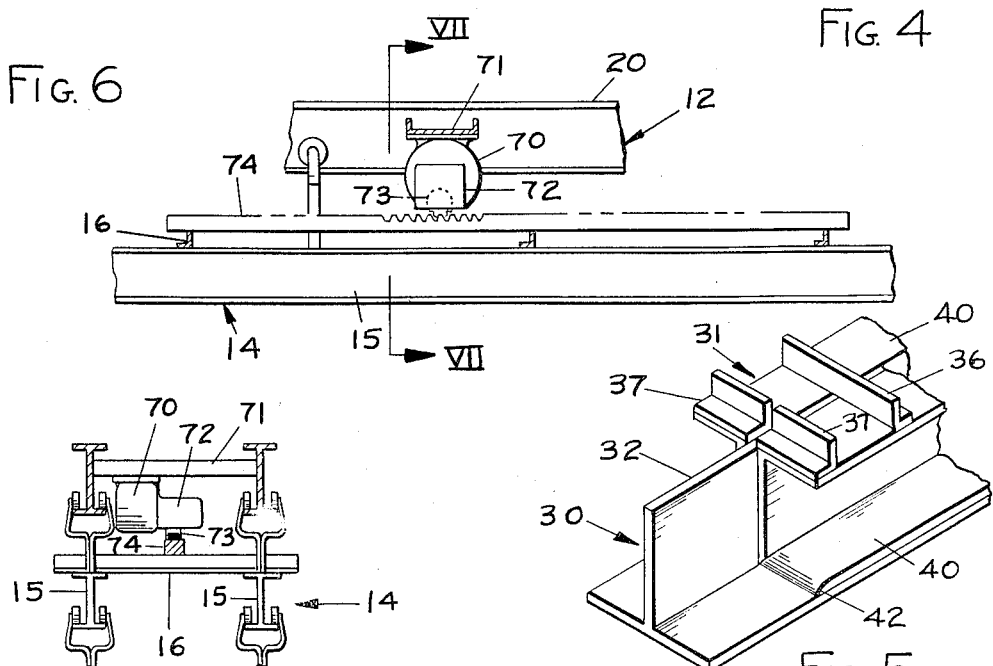
INVENTORS:
WILLIAM BEVERIDGE
EGBERT WOLDRING
BY
Peter P. Price
ATTORNEY

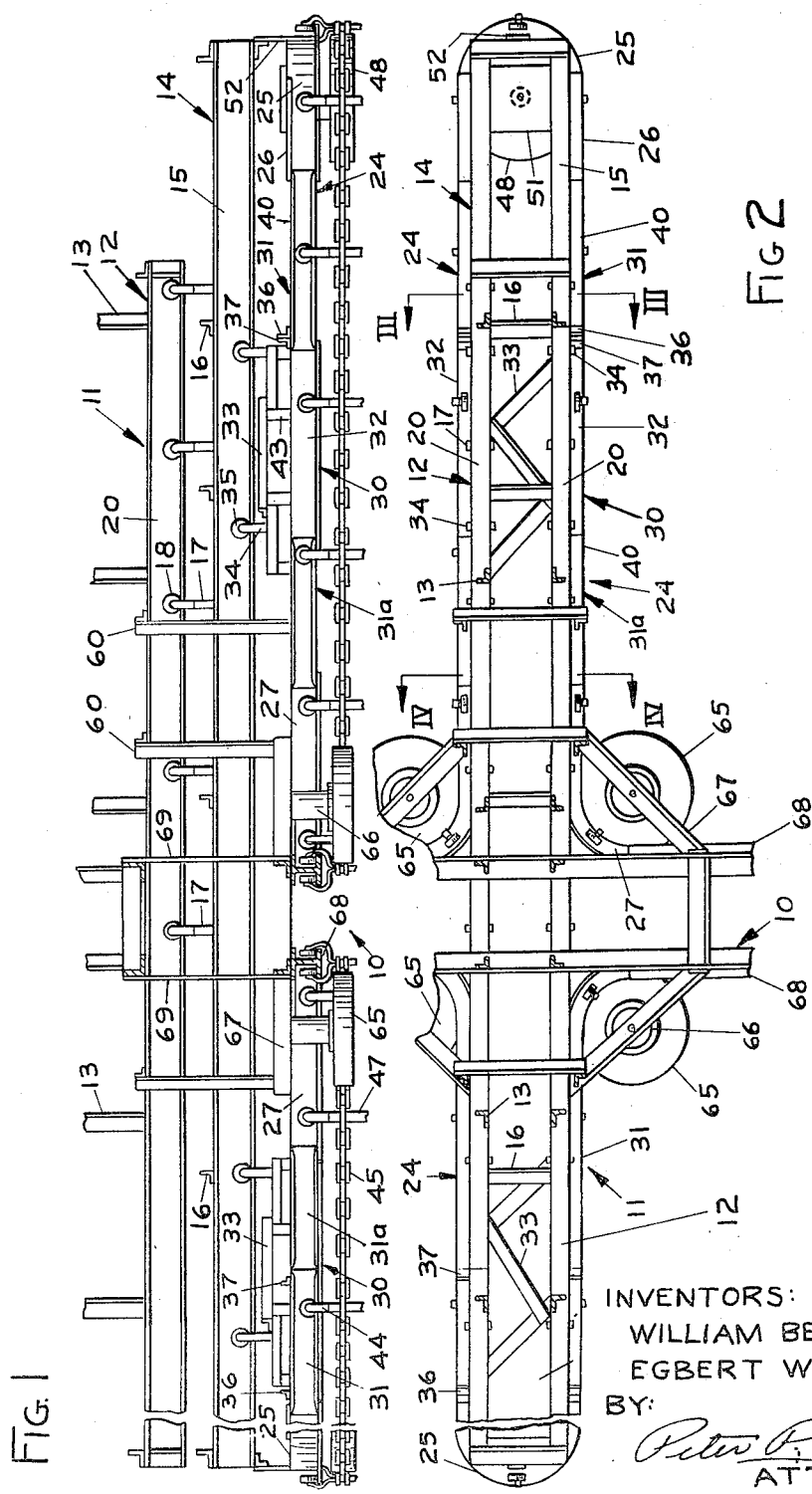

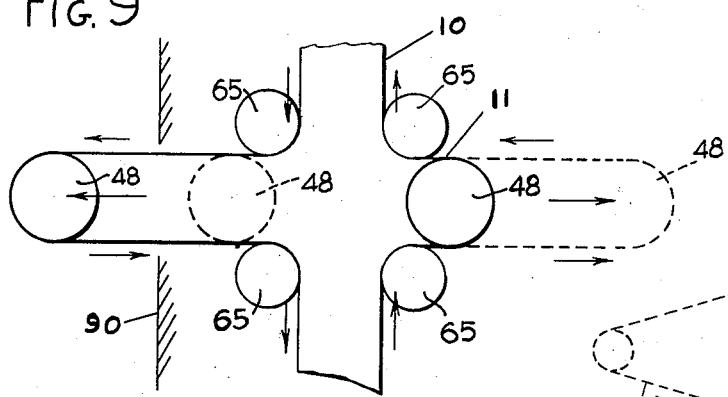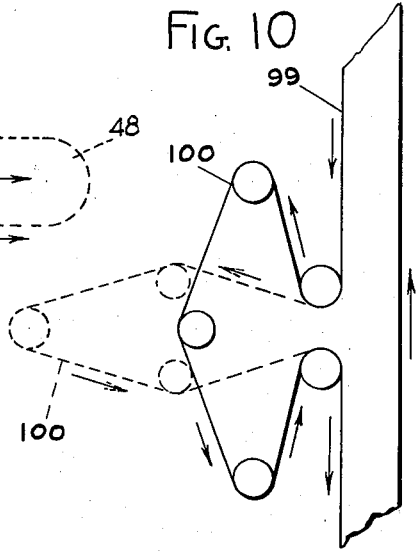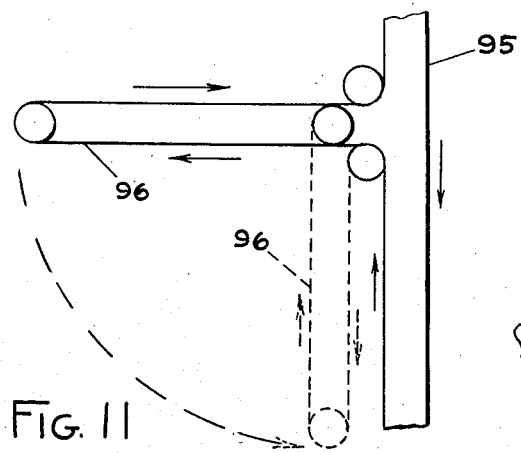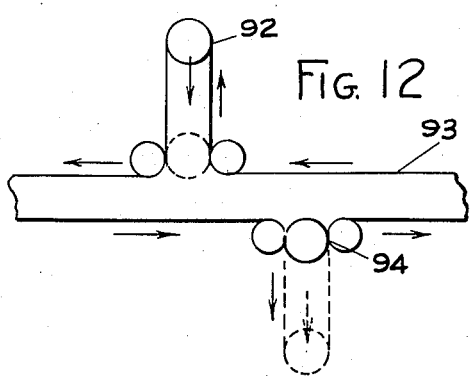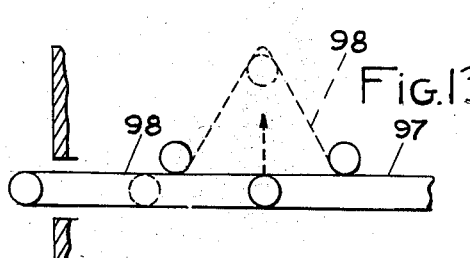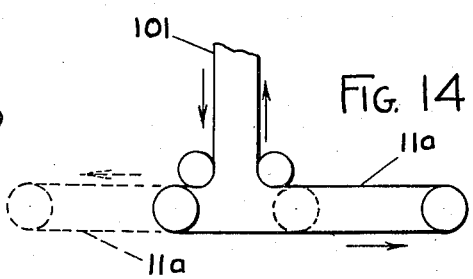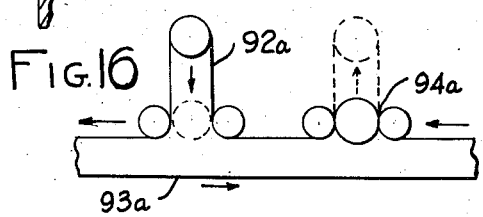

Dec. 16, 1958　　　　E. WOLDRING ET AL　　　　2,864,319
EXTENDIBLE ENDLESS CHAIN CONVEYOR
Filed Oct. 22, 1954　　　　　　　　　　　　　　4 Sheets-Sheet 4

INVENTORS:
WILLIAM BEVERIDGE
EGBERT WOLDRING
BY
Peter P. Price
ATTORNEY

United States Patent Office 2,864,319
Patented Dec. 16, 1958

2,864,319

EXTENDIBLE ENDLESS CHAIN CONVEYOR

Egbert Woldring, Grand Rapids, and William Beveridge, Detroit, Mich., assignors to Rapistan-Keystone, Inc., Detroit, Mich., a corporation of Michigan Application October 22, 1954, Serial No. 463,996

10 Claims. (Cl. 104—91)

This invention relates to overhead conveyors, particularly of the monorail type and has the object of adding to such conveyors an extendible spur whereby a section of the conveyor may be caused to project over a loading dock or into a working area where the conveyor is temporarily required.

The primary object of this invention is to provide means by which a standard overhead conveyor may be modified to make it possible to extend the main conveyor line into an area in which it does not normally operate for the purpose of either loading or unloading the conveyor at that point. In this connection, this invention is designed to permit the conveyor to extend over a loading dock into a railway car or truck so that the conveyor may be used as a loader or unloader without necessitating transfer of the articles by intermediate transport means from the vehicle to the main conveyor. It also has utility in certain plant arrangements where it is temporarily desired to provide overhead conveyor facilities in a particular area of operation.

The object of this invention is to provide an extendible spur track the operation of which does not vary the length of the conveyor chain. The invention provides compensating means at some point along the conveyor line capable of releasing slack into the chain as chain demand is created by the spur and of absorbing slack in the chain as chain is released when the spur is contracted.

An additional object of this invention is to provide such a spur arrangement which will not interfere with the normal operation of the conveyor either by limiting the character of its use or necessitating stoppage of the conveyor while the spur is being extended or contracted.

These and other objects and purposes of this invention will be readily seen by those acquainted with the field of materials handling and particularly that of overhead conveyor systems upon reading the following specification and the accompanying drawings.

In the drawings:

Fig. 1 is a fragmentary side elevation view of a preferred embodiment of this invention.

Fig. 2 is a fragmentary plan view of the structure shown in Fig. 1.

Fig. 3 is a sectional elevation view taken along the plane III—III of Fig. 2.

Fig. 4 is a sectional elevation view taken along the plane IV—IV of Fig. 2.

Fig. 5 is an enlarged, oblique, fragmentary view of the telescoping joint in the chain track.

Fig. 6 is a view of a modified construction for our invention.

Fig. 7 is a sectional elevation view taken along the plane VII—VII of Fig. 6.

Fig. 9 is a schematic view of our invention.

Fig. 10 is a schematic view of a modified arrangement for our invention.

Fig. 11 is a schematic view of a further modified arrangement for our invention.

Fig. 12 is a schematic view of another modified arrangement for our invention.

Fig. 13 is a schematic view of an additional modified arrangement for our invention.

Fig. 14 is a schematic view of a further additional modified arrangement for our invention.

Fig. 16 is a schematic view of an additional modified arrangement for our invention.

Figure 8:
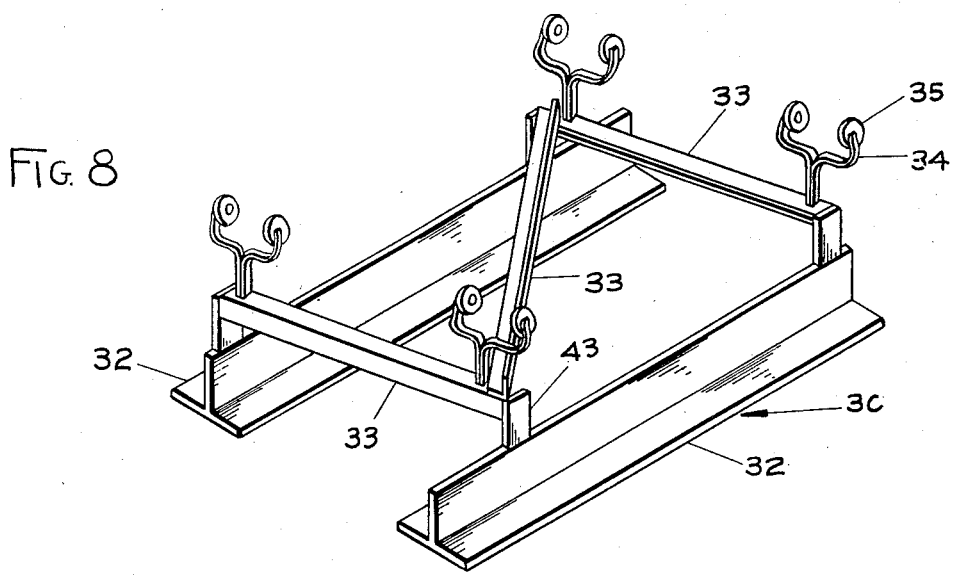
Fig. 8 is an oblique view of a floating track section for the spur conveyor track.

In executing the objects and purposes of this invention, we have provided a spur track which may be moved toward and away from the main conveyor track which spur, as it travels away from the main conveyor track, carries the article transporting chain with it and, as it retracts, returns this chain to the main conveyor track. Further means are provided to move oppositely and in coordination with the spur to either release slack into the conveyor chain or to take up slack, depending upon which direction the spur is moving with relation to the main conveyor track. In this invention, the total length of the endless conveyor chain is constant at all times, the invention automatically compensating for absorption or creation of slack in the chain.

Referring specifically to the drawings, the embodiment of the invention illustrated in Figs. 1 through 5 and 8 is schematically presented in Fig. 9. The numeral 10 indicates a main conveyor track and the numeral 11 indicates a spur conveyor. In the particular embodiment illustrated in Figs. 1 through 4 and 8, the spur conveyor 11 is normal to the main conveyor track 10 and extends laterally from both sides thereof.

The spur conveyor 11 is supported by a stationary frame 12, the frame 12 being supported from above by suitable standards 13. It will be recognized that, if desired, the stationary frame could be supported from the floor rather than suspended from above. The frame 12 extends outwardly from the main conveyor 10 an equal distance on each side and consists of a pair of I-beams 20, the lower flanges of which provide a track for the trolley supports 17 for the traveling boom 14. The traveling boom consists of a pair of spaced I-beams 15 secured at suitable points by cross ties 16.

Projecting upwardly from and secured to the top of each of the beams 15 of the boom 14 are trolleys 17. The trolleys 17 are designed to seat about the bottom flange of the beams 20 of the stationary frame 12. Each of the trolleys 17 is equipped with a pair of freely rotatable wheels 18, one designed to ride on each side of the web of the beams 20. By means of the trolleys 17 and the wheels 18, the boom 14 may travel transversely of the conveyor 10 while suspended from the stationary frame 12.

Suspended below the boom 14 is the telescoping conveyor track 24. The telescoping conveyor track includes a pair of semi-circular end sections 25, each having a pair of terminal portions 26 which are stationary relative to the boom 14. The curved portions of the end sections 25 are of inverted T-shape while the terminal portions 26 are of I-beam shape. They may also be formed from I-beam stock, if desired.

Where the telescoping track 25 intersects the main conveyor, inner terminal sections 27 are provided, two on each side of the main conveyor 10. The terminal sections 27 are curved in a horizontal plane so that one end is aligned with the conveyor spur 11 and the other is aligned with the main conveyor track 10.

Between the curved end sections 25 and the terminal pieces 27, the track consists of several sections designed to telescope one upon another to permit variation of the length of the track. Such a telescoping arrangement is provided on each side of the spur track 11 and on each side of the main track 10.

Each telescoping portion of the track consists of a floating track section 30 and two sliding track sections 31 and 31a. The floating track section includes a pair of track members 32, one on each side of the spur track. The track members 32 are of inverted T-shape and are rigidly tied together by a cross frame 33.

The members of the cross frame are attached to and spaced above the top of the track members 32 by spacer straps 43. This arrangement eliminates interference between the cross frame 33 and the hereinafter described stops 37 on the sliding track sections 31. The cross frame in turn is suspended from the boom 14 by means of trolleys 34 and wheels 35. This mounting permits the floating track section 30 to travel longitudinally of the boom 14.

The sliding track sections 31 and 31a are identical, each consisting of a pair of C-shaped channel sections 40 placed in back to back position and spaced apart sufficiently to permit passage of the vertical web of the track members 32 between them (Figs. 1, 3 and 5). The height of the channel sections 40 making up the sliding sections 31 and 31a is such that they will telescope over the track members 32 with their lower flanges riding upon the top surface of the bottom flange of the floating track members 32 and their upper flange riding just below the top of the vertical web of the floating track members 32. Each of the sliding track sections 31 is rigidly secured to an inner end of a terminal portion 26 of an end track section 25. Each of the sliding track sections 31 and 31a is rigidly secured to the outer end of one of the terminal pieces 27. A stationary stop 36 is provided on the outer end of the floating track section 30 for cooperation with the stop 37 on the inner end of the sliding track section 31 (Figs. 1, 2 and 5). Cooperation between these stops limits the extending movement of the sliding track section 31 relative to the floating track section 30 to move with the sliding track sections 31 thereby causing it to withdraw from the sliding track sections 31a.

Both ends of the sliding track sections 31 and 31a are tapered as illustrated at 42 in Fig. 5. This tapering eases the wheels of the trolley 44 onto and off the sliding track sections without excessive shock and wear and reduces the force necessary to move the trolleys over these transitional points.

Suspended below the track by means of trolleys 44 is a driven, endless, conveyor chain 45. Goods transported by the conveyor are suspended from article hangers 47 depending below the chain 45.

Where the chain 45 turns about the semi-circular end sections 25 of the spur track, a guide wheel 48 is provided to support the chain in its radial movement. The guide wheel 48 is mounted for free rotation on a shaft mounted to the conveyor track 25 by the plate 51. The plate 51 is secured to the end section 25. Each end section 25 of the spur track 11 is in turn rigidly secured to the boom 14 by means of a strap 52. Thus, as the boom moves inwardly or outwardly, the end section 25 is positively carried with it to insure extending and contracting, telescopic movement of the track.

Since the terminal pieces 27 do not move in relation to the stationary frame 12, they may be supported directly from the frames 60. This method of supporting the terminal pieces 27 assures their positive alignment with the floating sections 30 even though the conveyor chain may be heavily loaded.

Where the chain transfers to or from the spur track 11 to the main conveyor track 10, it is guided in its turning movement by a pulley 65. Four such pulleys are provided. Each of the pulleys 65 is mounted for free rotation about a shaft secured in a bearing 66. The bearings 66 are in turn mounted to diagonal brackets 67 extending from the spur track 11 to the main conveyor track 10.

The main conveyor track 10 consists of a pair of spaced track rails 68 suspended from above by means of hanger straps 69 (Fig. 1).

It will be understood that the movement of the boom 14 may be effected either manually or by power. If it is manual, it will be moved simply by being pushed transversely of the main conveyor 10 to cause it to extend or contract.

Figure 15:
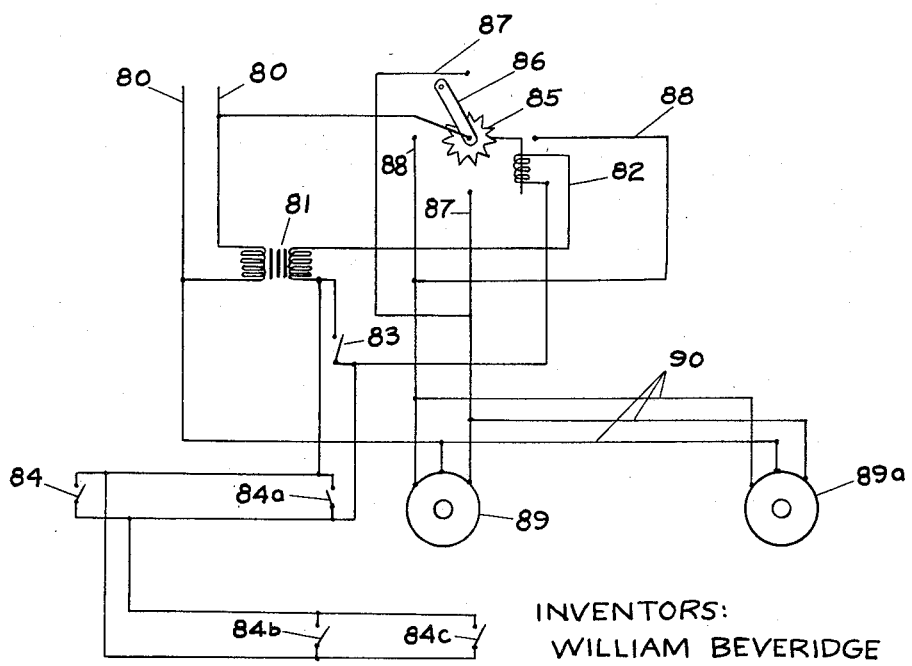
Fig. 15 is a wiring diagram for a powered arrangement for our invention.

Where, however, it is desired to move the boom by power, this may be done in any one of several ways. In the arrangement illustrated, a motor 70 is mounted between the beams of the stationary frame 12 by means of the cross member 71 (Figs. 6 and 7). The motor is equipped with a gear reducer 72 driving the pinion gear 73. The pinion gear meshes with a rack 74 secured to the cross members 16 of the boom 14. By providing a reversible motor, the boom can be caused to reciprocate transversely of the main conveyor 10. Suitable limit switches can be provided to control the operation of the motor in either direction. Fig. 15 is illustrative of a simple wiring diagram capable of carrying out this purpose, both where the spur consists of a single boom traversing the main conveyor track and where it consists of a pair of booms located remote from each other along the conveyor. In this latter case the operation of the two booms is coordinated by an electrical control system (Fig. 15).

Power is supplied through the lines 80 to a transformer 81. Power from the transformer 81 operates the solenoid 82. The operation of the solenoid, however, is controlled through the manual switch 83 and through the limit switches 84 and 84a, located one on each end of the run of the boom to open the motor circuit when the boom has reached the limit of its travel. The solenoid 82 is of the non-holding type and each operation turns the stepping mechanism 85 ⅛th turn. The stepping mechanism 85 moves the sweep arm 86 designed to cross the contacts 87 and 88. The contacts 87 and 88 are arranged in oppositely disposed pairs. The sweep arm 86 is connected to one side of the power source 80. When it engages one of the contacts 87, the motor 89 will be energized to rotate in one direction and when it engages one of the contacts 88 the motor 89 will be energized to rotate in the opposite direction. The effect of the sweep arm 86 is to reverse the motor following each operation.

Where two booms are used at different locations on the conveyor, a second motor 89a is used and is energized by the conductors 90, thus coordinating its operation with the motor 89. To improve safety, an additional pair of limit switches 84b and 84c may be utilized. The limit switches 84b and 84c are used to positively prevent overrun of the boom operated by the motor 89a.

It will be recognized that this is but one possible wiring arrangement usable for operating the boom or for coordinating the operation of a multiple boom arrangement. Similarly it will be recognized that systems employing either hydraulic or pneumatic power sources may be substituted.

*Operation*

Assuming the spur to be in inoperative or retracted position, the spur would be in the position indicated by the broken lines in Fig. 9. In order to extend the spur for use, it will be moved from this position to the position shown in full lines. Assuming the use to be that of servicing a loading dock in the extended position, the spur will pass through the wall indicated by the numeral 90 and then out over the loading dock area. With the chain traveling in the direction indicated by the arrows, the articles will be carried out on the spur into the loading dock area where they will be removed at the end of the conveyor spur.

By this arrangement, articles can be moved directly from a warehouse or a manufacturing floor to a railway car or truck by means of a single conveyor. This invention enables the standard overhead conveyor system, with which many plants are currently equipped, to be so modified that that system will carry the goods into and out of the dock loading area, eliminating all necessity for intermediary conveyor means to transfer the articles from the conveyor onto the loading dock area. Thus, not only is considerable transfer equipment rendered unnecessary but the entire crew necessary to execute the intermediate transfer is eliminated. The result is a substantially faster loading operation at materially reduced labor cost.

When the spur's operation is complete, it will be retracted to the position indicated in broken lines and the opening onto the loading dock can then be closed by means of doors. Any standard door will suffice since the spur completely contracts and does not interfere with the door's operation. This is a particularly important feature in northerly areas where it is undesirable to keep the doors open longer than is essential.

The addition of the spur to the conveyor does not interfere with its use since in either extended or contracted position, the conveyor may be used to carry articles not only out on the spur but may be used to carry the articles completely past the area where the spur is located. Thus, in a large plant or warehouse, a number of spurs may be used depending upon the number of loading places it is desired to service. Since each spur is self contained in its operation, that is, automatically providing its own chain slack and take-up, each of a group of these spurs may be independently operated without one interfering with another.

The spur may be added to existing conveyor systems with a minimum of difficulty. It is only necessary to remove a section of the main conveyor track and add the structure for the spur together with the pulleys 65 for guiding the chain from the main conveyor track onto and off the conveyor track at the base of the spur. Sufficient additional chain is added to the conveyor to compensate for the length of track utilized by the spur. This is a predetermined constant amount since the track, although it is of telescoping design and, therefore, expands and contracts, always maintains a constant chain length.

In the embodiment of the invention shown in Figs. 1 and 2, a single floating track section 30 is utilized on each side of each end of the spur track 11. It will be recognized that two or more floating track sections 30 may be employed. The number of floating track sections used will depend upon the distance it is desired to extend the spur track. Where multiple floating track sections are employed an intermediate sliding track section 30 will be used between each pair of floating track sections. The intermediate sliding track sections will be supported directly from the stationary frame 12 by hangers similar to the hangers 60. Where very long booms are used, their extended end may be provided with a special floor support to prevent deflection.

Fig. 12 illustrates an arrangement in which the spur is so designed that that portion 92 of the spur projecting into the loading dock or working area is located at one point along the main conveyor 93 and the slack releasing and absorbing portion 94 is located at a point remote from the first portion 92. In this arrangement, the construction of the spur is identical to that shown in Figs. 1 and 2 except that one-half of the spur track is located at each point and neither portion extends across the main conveyor line. As illustrated in Fig. 12, the operating portion 92 of the spur track is located on one side of the main conveyor 93 while the compensating portion 94 is located on the opposite side of the conveyor track 10. It will be recognized that both the operating and the compensating portions of the spur track may be located on the same side of the conveyor track if this arrangement is found more desirable. Such a construction is shown in Fig. 16, the operating portion 92a of the spur track and the compensating section 94a are both located on the same side of the main conveyor 93a. The electrical diagram in Fig. 15 illustrates a simple and convenient method for coordinating the movement of the operating and compensating portions of the spur irrespective of how they are related to the main conveyor. It will be recognized from these illustrations that while an endless conveyor must be of necessity have both an outgoing and a return track, the present invention may readily be applied to only one of these tracks. Thus, it is unnecessary to have the two tracks of the main conveyor proximate in order to apply this invention.

It will be further recognized that various other arrangements may be used to cause a portion of a main conveyor line 95 to temporarily extend into a particular operational area such as a loading dock. Figs. 10-14 and 16 schematically illustrate these arrangements. Pulleys operating similar to pulleys 48 and 65 of Fig. 9 are shown but not designated by any number for sake of simplicity.

Fig. 11 illustrates this being accomplished by means of a swinging boom 96 swinging in a horizontal plane from the inoperative position indicated by broken lines to the operative position indicated in full lines.

Fig. 13 illustrates another method by which this might be accomplished. In this arrangement, the conveyor 97 has, at an end point, a spur section 98 designed, in extend position, to be horizontal and, in retracted position, to be formed into an inverted V. In this case, as in the other cases, the use of the spur will not interfere with the normal use of the conveyor since articles may pass along the conveyor and over the spur whether the spur is in extended or contracted position. The spur 98 is illustrated in full lines in extended position and in broken lines in contracted position.

Fig. 10 illustrates a lazy tongs arrangement extending to one side of the conveyor 97 in which the spur conveyor 100 may be hinged at five points so that in contracted position it assumes the shape, in plan view, of an elongated diamond with the long axis parallel to the main conveyor 10 and in extended position forms a similar shape but with the long axis extending normal to the main conveyor.

Fig. 14 illustrates the application of the spur 11a to the terminus of a conveyor line 101. In this case the spur 11a forms a T-shaped end for the main conveyor.

Figs. 9 through 14 merely illustrate different arrangements embodying the principle of this invention. They all embody the concept of incorporating the spur directly into the main conveyor and of so arranging the spur that the total length of the conveyor chain remains constant at all times irrespective of the position of the spur.

It will be recognized that various other modifications of this invention may be made. These modifications are each to be considered as included in the hereinafter appended claims unless these claims by their language expressly state otherwise.

We claim:

1. In a conveyor having a main track and an endless chain movable therealong, an extensible spur comprising: a spur track section extending transversely of said main track; said spur track section having a first portion and a second portion; means mounting each of said portions for coordinated movement toward and away from said main track; a portion of said endless chain mounted on and movable along each portion of said spur track section; said first portion being adapted to move oppositely with respect to the centerline of said main track to the movement of said second portion whereby the overall length of and tension in said endless chain remains constant regardless of the position of said spur track.

2. In a conveyor having a main track and an endless chain movable therealong, an extensible spur comprising: a spur track section extending transversely of said main track; said spur track section having a first portion and a second portion; both said first and section portions extending outwardly from the same side of said main track; means mounting each of said portions for coordinated movement toward and away from said main track; a portion of said endless chain mounted on and movable along each portion of said spur track section; said first portion being adapted to move oppositely with respect to the centerline of said main track to the movement of said second portion whereby the overall length of and tension in said endless chain remains constant regardless of the position of said spur track.

3. In a conveyor having a main track and an endless chain movable therealong, an extensible spur comprising: a spur track section extending transversely of said main track; said spur track section having a first portion and a second portion; said first portion extending from one side of said main track and said second portion extending from the opposite side of said main track; means mounting each of said portions for coordinated movement toward and away from said main track; a portion of said endless chain mounted on and movable along each portion of said spur track section; said first portion being adapted to move oppositely with respect to the centerline of said main track to the movement of said second portion whereby the overall length of and tension in said endless chain remains constant regardless of the position of said spur track.

4. In a conveyor having a main track and an endless chain movable therealong, an extensible spur comprising: a spur track section extending transversely of said main track; said spur track section having a first portion and a second portion; said first portion being spaced longitudinally of said main track from said second portion; means mounting each of said portions for movement toward and away from said main track; a portion of said endless chain mounted on and movable along each portion of said spur track section; means for coordinating the movements of said portions of said spur track section; said first portion being adapted to move oppositely with respect to the centerline of said main track to the movement of said second portion whereby the overall length of and tension in said endless chain remains constant regardless of the position of said spur track.

5. In an overhead conveyor having a main track and an endless article carrier therealong, an extensible spur comprising: a spur track section extending transversely of said main track; said spur track section having a first portion and a second portion; each of said portions having telescoping members whereby the length of said portions is variable; means mounting each of said portions for movement toward and away from said main track; a portion of said endless article carrier mounted on and movable along each portion of said spur track section; means coordinating the movement of said portions of said spur track section; said first portion being adapted to move oppositely with respect to the centerline of said main track to the movement of said second portion whereby the overall length of and tension in said endless article carrier remains constant regardless of the position of said spur track.

6. In an overhead conveyor having a main track and an endless conveyor chain movable therealong, an extensible spur comprising: a boom extending transversely of said main track and projecting from each side thereof; means supporting said boom for movement transversely of said main track; a pair of spur track sections one mounted to and depending from said boom on each side of said main track; each of said spur track sections having a telescoping section; a portion of said endless conveyor chain being mounted upon and movable along each of said spur track sections; means for guiding and transferring said endless conveyor chain between said main track and each of said spur track sections; said boom being adapted to coordinate the expansion and contraction of said telescoping sections whereby the length of and tension in said endless conveyor chain remains constant regardless of the position of said spur track.

7. In an overhead conveyor having a main track and an endless conveyor chain movable therealong, an extensible spur comprising: a boom extending transversely of said main track and projecting from each side thereof; means supporting said boom for movement transversely of said main track; a pair of spur track sections one mounted to and depending from said boom on each side of said main track; each of said spur track sections having a telescoping section; each of said telescoping sections comprising a floating track movable with and along said boom; a stationary track section adapted to slidably and telescopically receive said floating track section; a portion of said endless conveyor chain being mounted upon and movable along each of said spur track sections; means for guiding and transferring said endless conveyor chain between said main track and each of said spur track sections; said boom being adapted to coordinate the expansion and contraction of said telescoping sections whereby the length of and tension in said endless conveyor chain remains constant regardless of the position of said spur track.

8. In an overhead conveyor having a main track and an endless article carrier movable therealong, an extensible spur comprising: a spur track section extending transversely of said main track; hinge means for mounting said spur track section to said main track whereby said spur track may be made to swing toward and away from said main track; a portion of said endless article carrier being mounted on and adapted to traverse said spur track section; said spur track section being adapted to maintain a constant overall length of and a constant tension in said endless article carrier chain.

9. In an overhead conveyor having a main track and an endless article carrier movable therealong, an extensible spur comprising: a spur track section extending transversely of said main track; a plurality of hinge means in said spur track whereby said spur track may assume a generally diamond shape, the long axis of said diamond in extended position being normal to said main track and in retracted position being parallel to said main track; a portion of said endless article carrier being mounted on and adapted to traverse said spur track section; said spur track section being adapted to maintain a constant overall length of and a constant tension in said endless article carrier.

10. A conveyor system comprising: a main track supporting an endless article carrier for movement therealong a predetermined endless path; an adjustable spur track projecting from said main track and supporting a portion of said endless article carrier for changing the path on which said articles are carried; means movably mounting said spur track for substantial movement toward and away from said main track to change said path; a slack control means; a portion of said article carrier being supported on said control means; means mounting said control means for movement simultaneously with said spur track so that the length of said portion of endless carrier mounted on said control means may vary simultaneously to the same extent and oppositely of the length of article carrier of said spur track whereby the overall length and tension of said endless article carrier is constant regardless of the path on which said articles are carried.

References Cited in the file of this patent

UNITED STATES PATENTS

| | | |
|---|---|---|
| 1,785,315 | Kennedy | Dec. 16, 1930 |
| 1,804,272 | Palmer | May 5, 1931 |
| 1,875,535 | Whitney | Sept. 6, 1932 |
| 1,876,373 | Whitney | Sept. 6, 1932 |
| 2,057,173 | Waalkes | Oct. 13, 1936 |
| 2,355,863 | Harris | Aug. 16, 1944 |
| 2,371,907 | Moore et al. | Mar. 20, 1945 |
| 2,387,542 | Taylor | Oct. 23, 1945 |
| 2,392,417 | Spafford et al. | Jan. 8, 1946 |
| 2,414,301 | Harris | Jan. 14, 1947 |
| 2,420,595 | Harris | May 13, 1947 |
| 2,486,221 | Spafford | Oct. 25, 1949 |
| 2,596,347 | Spafford | May 13, 1952 |
| 2,642,814 | Anjeskey | June 23, 1953 |